(12) United States Patent
Jung et al.

(10) Patent No.: US 12,149,197 B2
(45) Date of Patent: *Nov. 19, 2024

(54) HYBRID ELECTRIC VEHICLE AND MOTOR DRIVE APPARATUS FOR SAME

(71) Applicants: Hyundai Motor Company, Seoul (KR); Kia Corporation, Seoul (KR)

(72) Inventors: Choul Woo Jung, Gyeonggi-do (KR); In Ho Kim, Seoul (KR); Han Geun Jang, Seoul (KR); Nae Chun Park, Pyeongtaek-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 77 days.

This patent is subject to a terminal disclaimer.

(21) Appl. No.: 17/985,413

(22) Filed: Nov. 11, 2022

(65) Prior Publication Data
US 2023/0283207 A1 Sep. 7, 2023

(30) Foreign Application Priority Data

Mar. 7, 2022 (KR) .......................... 10-2022-0028983

(51) Int. Cl.
*H02P 5/74* (2006.01)
*B60K 6/38* (2007.10)
(Continued)

(52) U.S. Cl.
CPC ................ *H02P 5/74* (2013.01); *B60K 6/38* (2013.01); *H02M 1/0067* (2021.05);
(Continued)

(58) Field of Classification Search
CPC .. H02P 5/74; H02P 27/08; H02P 25/18; H02P 25/22; H02M 1/0067; H02M 7/537;
(Continued)

(56) References Cited

U.S. PATENT DOCUMENTS 6,744,146 B2 * 6/2004 Fulton ................ F02N 11/0859
290/40 C
7,226,383 B2 * 6/2007 Namba ................... B60K 6/48
477/14
(Continued)

FOREIGN PATENT DOCUMENTS

JP 2009-029395 A 2/2009
JP 2009-120154 A 6/2009
(Continued)

OTHER PUBLICATIONS

Tang et al., A Reconfigurable-Winding System for Electric Vehicle Drive Applications, 2017 IEEE Transportation Electrification Conference and Expo (ITEC), IEEE, Jun. 22, 2017 (Jun. 22, 2017), pp. 656-661, XP033129485.
(Continued)

*Primary Examiner* — Tulsidas C Patel
*Assistant Examiner* — Thomas K Quigley
(74) *Attorney, Agent, or Firm* — Morgan, Lewis & Bockius LLP

(57) ABSTRACT

Proposed is a motor drive apparatus driving first and second motors having first wirings and second wirings, respectively, including a first inverter including first switching elements, an alternating-current terminal of the first inverter being connected to a first terminal of each of the first wirings, a second inverter including second switching elements, a first change-over switch including third switching elements, first-side terminals thereof being connected to second terminals of the first wirings, respectively, and second-side terminals being connected, a second change-over switch including fourth switching elements, first-side terminals thereof being connected to the second terminals, respectively, and second-side terminals being connected to an alternating-current terminal of the second inverter, a third change-over switch including fifth switching elements, first-
(Continued)

side terminals thereof being connected to the alternating-current terminal, and second-side terminals being connected to the second wirings, respectively, and a controller controlling turned-on and -off states of the first to fifth switching elements.

14 Claims, 10 Drawing Sheets

(51) Int. Cl.
      *H02M 1/00*       (2006.01)
      *H02M 7/537*       (2006.01)

(52) U.S. Cl.
      CPC ......... *H02M 7/537* (2013.01); *B60Y 2200/92* (2013.01); *B60Y 2400/61* (2013.01)

(58) Field of Classification Search
      CPC .... B60K 6/38; B60Y 2200/92; B60Y 2400/61
      See application file for complete search history.

(56) References Cited

U.S. PATENT DOCUMENTS

| | | | | |
|---|---|---|---|---|
| 10,137,882 | B2* | 11/2018 | Park | B60L 15/2054 |
| 10,220,828 | B2* | 3/2019 | Cho | B60K 6/485 |
| 10,322,716 | B2* | 6/2019 | Park | B60K 6/48 |
| 10,399,561 | B2* | 9/2019 | Koh | B60W 10/06 |
| 10,581,306 | B2* | 3/2020 | Lim | H02K 11/225 |
| 10,882,507 | B2* | 1/2021 | Ohn | B60L 50/61 |
| 11,050,379 | B1* | 6/2021 | Floreancig | H02M 5/04 |
| 2001/0048226 | A1* | 12/2001 | Nada | F02N 11/04 |
| | | | | 290/40 C |
| 2002/0113441 | A1* | 8/2002 | Obayashi | H02J 7/1423 |
| | | | | 290/40 C |
| 2009/0033253 | A1 | 2/2009 | Nagashima et al. | |
| 2014/0136035 | A1 | 5/2014 | Boskovitch et al. | |
| 2015/0133263 | A1* | 5/2015 | Choi | B60K 17/356 |
| | | | | 477/3 |
| 2016/0036308 | A1* | 2/2016 | Bailey | B63H 21/20 |
| | | | | 310/91 |
| 2016/0052383 | A1 | 2/2016 | Caron | |
| 2017/0234285 | A1 | 8/2017 | Huh et al. | |
| 2018/0105164 | A1* | 4/2018 | Jung | B60W 20/50 |
| 2019/0229670 | A1* | 7/2019 | Arisawa | H02P 27/08 |
| 2019/0263248 | A1* | 8/2019 | Kong | B60W 10/02 |
| 2020/0059189 | A1* | 2/2020 | Ohashi | H02P 27/06 |
| 2021/0146788 | A1 | 5/2021 | Kobayashi | |
| 2021/0211083 | A1* | 7/2021 | Jore | B60L 50/70 |

FOREIGN PATENT DOCUMENTS

| | | |
|---|---|---|
| JP | 6285256 B2 | 2/2018 |
| WO | 2010/151775 A1 | 12/2010 |
| WO | 2017/127557 A1 | 7/2017 |

OTHER PUBLICATIONS

Extended European Search Report dated Jul. 18, 2023, issued in corresponding European Patent Application No. 22208043.4.

* cited by examiner

HYBRID ELECTRIC VEHICLE AND MOTOR DRIVE APPARATUS FOR SAME

CROSS REFERENCE TO RELATED APPLICATION

The present application claims priority to Korean Patent Application No. 10-2022-0028983, filed March 7 in the Korean Intellectual Property Office, 2022, the entire contents of which is incorporated herein for all purposes by this reference.

TECHNICAL FIELD

The present disclosure relates to a hybrid electric vehicle and a motor drive apparatus for the hybrid electric vehicle and, particularly, to a hybrid electric vehicle capable of driving two different motors using a small number of inverters and a motor drive apparatus for the hybrid electric vehicle.

BACKGROUND

With an increasing interest in the environment, there is a trend toward an increase in the number of environment-friendly vehicles, each having an electric motor as a motive power source. The environment-friendly vehicle is also referred to as an electrified vehicle, and a typical example thereof is hybrid electric vehicle (HEV).

Usually, in addition to an engine and a drive motor, a hybrid starter generator (HSG) capable of starting the engine or generating electric power using drive power of the engine is provided in a power train of the hybrid electric vehicle.

Usually, first-side terminals of wirings, corresponding to different phases, that are included in the motor are connected to one inverter, and the second-side terminals thereof are connected to each other, thereby making a Y-connection. When driving the motor, a switching element within the inverter is turned on/off by performing a pulse width modulation control, and thus a voltage between electric power lines is applied to the wirings of the Y-connected motor, thereby generating torque.

Therefore, in the hybrid electric vehicle in the related art, an inverter for the drive motor and an inverter for the HSG are separately provided, and the drive motor and the HSG are controlled.

However, the more increased the number of wirings of a motor in order to increase a maximum torque of the motor, the farther positioned a section having a high-voltage utilization ratio is from a low-torque area that is a primary operating point for the vehicle. Thus, there is a problem in that fuel efficiency is deceased. In addition, when design is performed in terms of the fuel efficiency in such a manner that the primary operating point is included in a section having the voltage utilization ratio, there is a limitation on the maximum torque of the motor. Thus, there is a problem in that accelerated starting performance of the vehicle is decreased.

In the art, there is a demand for a motor drive technology for enabling one motor to be in charge of both a low-output section and a high-output section and, at the same time, improving the efficiency of a system. Thus, in recent years, there have been proposed technologies for driving one motor in two different modes using two inverters and a mode change-over switch.

Accordingly, when two inverters and a mode change-over switch are used in the drive motor, at least three inverters, including an inverter for the HSG, are required in the hybrid electric vehicle.

The foregoing is intended merely to aid in understanding the background of the present disclosure and therefore should not be interpreted to admit that the present disclosure falls within the purview of the related art that is already known to a person of ordinary skill in the art.

SUMMARY

An objective of the present disclosure is to provide a hybrid electric vehicle capable of driving a hybrid starter generator, as well as switching between drive modes for a drive motor, using a small number of inverters and a motor drive apparatus for the hybrid electric vehicle.

The present disclosure is not limited to the above-mentioned objectives. From the following description, other objectives not mentioned would be clearly understandable by a person of ordinary skill in the art to which the present disclosure pertains.

According to an aspect of the present disclosure, there is provided a motor drive apparatus driving a first motor having a plurality of first wirings and a second motor having a plurality of second wirings, the motor drive apparatus including: a first inverter including a plurality of first switching elements, an alternating-current terminal of the first inverter being connected to a first terminal of each of the plurality of first wirings; a second inverter including a plurality of second switching elements; a first change-over switch including a plurality of third switching elements, first-side terminals of the plurality of third switching elements being connected to second terminals of the plurality of first wirings, respectively, and second-side terminals thereof being connected to each other; a second change-over switch including a plurality of fourth switching elements, first-side terminals of the plurality of fourth switching elements being connected to the second terminals of the plurality of first wirings, respectively, and second-side terminals thereof being connected to an alternating-current terminal of the second inverter; a third change-over switch including a plurality of fifth switching elements, first-side terminals of the plurality of fifth switching elements being connected to the alternating-current terminal of the second inverter, and second-side terminals thereof being connected to the plurality of second wirings, respectively; and a controller configured to control turned-on and -off states of the first switching element to fifth switching element in response to a drive command for one of the first motor, the second motor and combination thereof.

In the motor drive apparatus, when the first motor and the second motor are driven, the controller may turn on the first change-over switch and the third change-over switch and may turn off the second change-over switch.

In the motor drive apparatus, the controller may perform pulse width modulation control of the plurality of first switching elements, thereby driving the first motor and may perform the pulse width modulation control of the plurality of second switching elements, thereby driving the second motor.

In the motor drive apparatus, the controller may turn off the first change-over switch and the third change-over switch and may turn on the second change-over switch, thereby driving the first motor in an open end winding mode.

In the motor drive apparatus, the controller may perform pulse width modulation control of the first switching element and the second switching element in the open end winding mode, thereby driving the first motor.

In the motor drive apparatus, when the drive command indicates that only the first motor is driven, the controller may drive the first motor in a closed end winding mode or an open end winding mode based on an operating point in accordance with a required output.

In the motor drive apparatus, the controller may turn on the first change-over switch and the third change-over switch and turns off the second change-over switch in the closed end winding mode and may turn off the first change-over switch and the third change-over switch and turns on the second change-over switch in the open end winding mode.

According to another aspect of the present disclosure, there is provided a hybrid electric vehicle including: a first motor having a plurality of first windings; a second motor having a plurality of second windings; an engine; a control unit outputting a drive command for driving one of the first motor, the second motor and combination thereof, and the engine based on a traveling situation; and a motor drive apparatus driving the first motor and the second motor in response to the drive command In the hybrid electric vehicle, the motor drive apparatus includes a first inverter including a plurality of first switching elements, an alternating-current terminal of the first inverter being connected to a first terminal of each of the plurality of first wirings; a second inverter including a plurality of second switching elements; a first change-over switch including a plurality of third switching elements, first-side terminals of the plurality of third switching elements being connected to second terminals, respectively, of the plurality of first wirings and second-side terminals thereof being connected to each other; a second change-over switch including a plurality of fourth switching elements, first-side terminals of the plurality of fourth switching elements being connected to the second terminals, respectively, of the plurality of first wirings and second-side terminals thereof being connected to an alternating-current terminal of the second inverter; a third change-over switch including a plurality of fifth switching elements, first-side terminals of the plurality of fifth switching elements being connected to the alternating-current terminal of the second inverter, and second-side terminals thereof being connected to the plurality of second wirings, respectively; and a controller configured to control turned-on and -off states of the first switching element to fifth switching element in response to a drive command for one of the first motor, the second motor and combination thereof.

The hybrid electric vehicle may further include an engine clutch arranged between the engine and the first motor, wherein the second motor may be connected to the engine.

In the hybrid electric vehicle, the second motor may be connected directly to the engine in a coaxial manner, and the engine clutch may be arranged between the second motor and the first motor.

In the hybrid electric vehicle, when the first motor and the second motor are driven, the controller may turn on the first change-over switch and the third change-over switch and may turn off the second change-over switch.

In the hybrid electric vehicle, the controller may perform pulse width modulation control of the plurality of first switching elements, thereby driving the first motor and may perform the pulse width modulation control of the plurality of second switching elements, thereby driving the second motor.

In the hybrid electric vehicle, the controller may turn off the first change-over switch and the third change-over switch and may turn on the second change-over switch, thereby driving the first motor in an open end winding mode.

In the hybrid electric vehicle, the controller may perform pulse width modulation control of the first switching element and the second switching element in the open end winding mode, thereby driving the first motor.

The hybrid electric vehicle according to the embodiment of the present disclosure can selectively drive a hybrid starter generator, as well as switching between drive modes for a drive motor, using a plurality of change-over switches.

Therefore, from the perspective of the drive motor, this feature of the hybrid electric vehicle can improve the efficiency in all torque sections when compared with a general-type Y-connected motor in the related art that is driven with one inverter. Thus, there is an advantage in that the improvement in all the torque sections contributes to an improvement in the fuel efficiency of the hybrid electric vehicle and that a dedicated inverter is not required from the perspective of the hybrid starter generator.

The present disclosure is not limited to the advantages mentioned above. From the following description, other advantages not mentioned would be clearly understandable by a person of ordinary skill in the art to which the present disclosure pertains.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
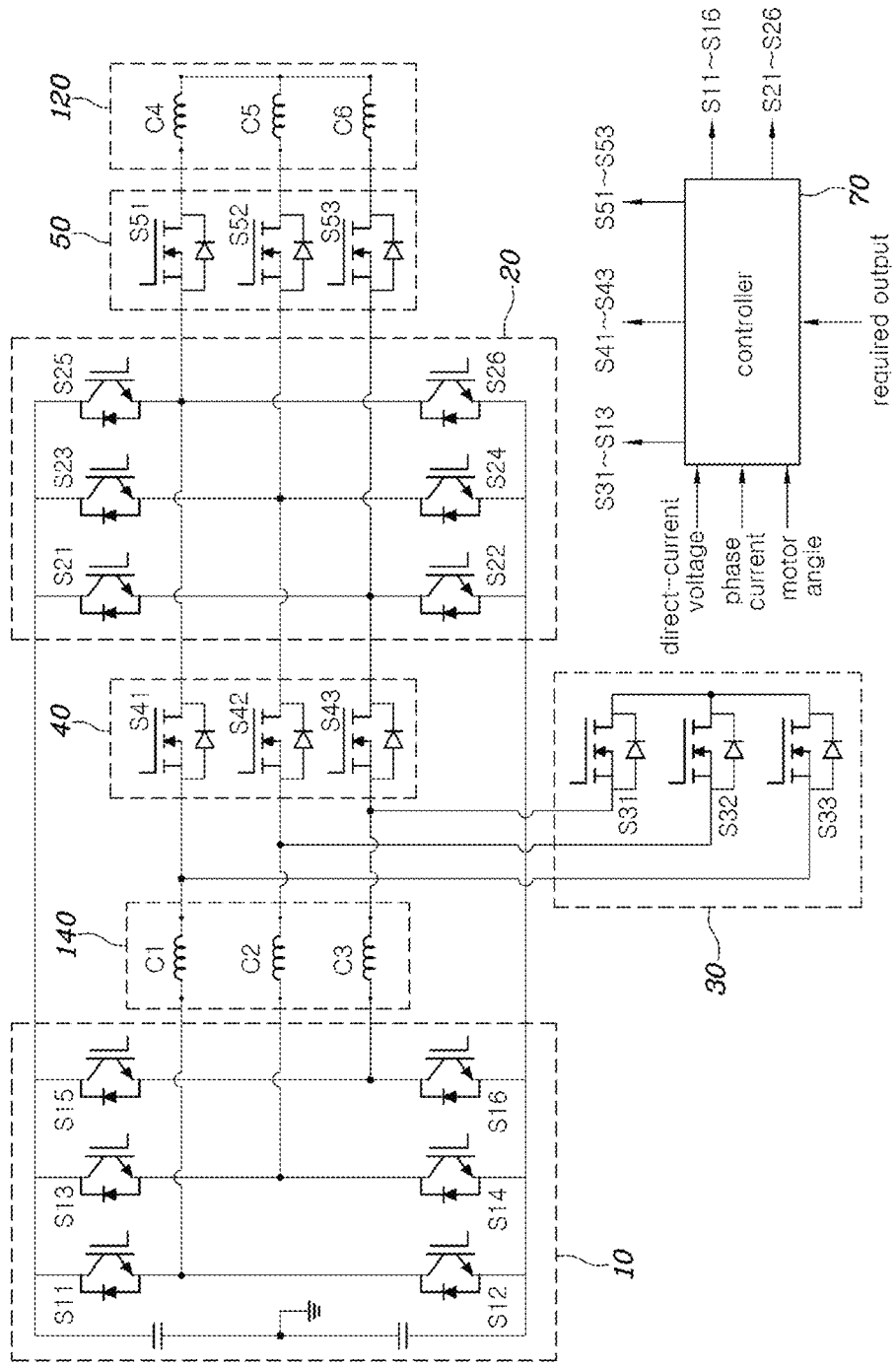
FIG. 1 is a circuit diagram illustrating a motor drive apparatus according to an embodiment of the present disclosure.

For disclosure, an embodiment of the present disclosure will be described below in detail with reference to the accompanying drawings. The same or similar constituent elements are given the same reference numeral, and descriptions thereof are not repeated. The terms "module" and "unit" are hereinafter interchangeably or individually used to represent a constituent element only for convenience in description in the present specification, but are not themselves intended to provide a distinguishing meaning or function. In addition, in describing the embodiment of the present disclosure, a detailed description of a well-known technology related thereto will be omitted when determined as making the nature and gist of the present disclosure unclear. The accompanying drawings are used only to help easily understand the technical idea of the present disclosure. It should be understood that the idea of the present disclosure is not limited by the accompanying drawings and that any alterations of, equivalents of, and substitutes for, a constituent element of the present disclosure are included within the scope of the present disclosure.

The terms "first", "second", and so on are used to describe various constituent elements, but do not impose any limitation on various constituent elements. These terms are used only to distinguish one element from another.

It should be understood that a constituent element, when referred to as being "coupled to" or "connected to" a different constituent element, may be directly coupled to or directly connected to the different constituent element or may be coupled to or connected to the different constituent element with a third constituent element in between. In contrast, it should be understood that a constituent element, when referred to as being "directly coupled to" or "directly connected to" a different constituent element, is coupled to or connected to the different constituent element without a third constituent element in between.

A noun in singular form has the same meaning as when used in plural form, unless it has a different meaning in context.

The terms "include", "have" and the like in the present application are intended to indicate that a feature, a number, a step, an operation, a constituent element, a component, or combinations of these, which is described in the specification, is present, and thus should be understood not to preclude the possibility that one or more other features, numbers, steps, operations, constituent elements, components, or combinations of these will be present or added.

In addition, the term unit or control unit included in a motor control unit (MCU), a hybrid control unit (HCU), and the like is widely used only to name a controller controlling a vehicle specific function and does not mean a generic function unit. For example, each control unit may include a communication device, a memory, and one or more processors. The communication device communicates with another controller or a sensor in order to functionally control a vehicle component. An operating system, a logic command, input and output information, and the like are stored in the memory. The one or more processors perform determination, computation, decision, and the like that are necessary to functionally control the vehicle component.

FIG. 1 is a circuit diagram illustrating a motor drive apparatus according to an embodiment of the present disclosure.

With reference to FIG. 1, the motor drive apparatus according to the embodiment of the present disclosure supplies drive electric power to a hybrid starter generator 120 having a plurality of windings C4 to C6 that correspond to a plurality of phases, respectively, and to a drive motor 140 having a plurality of windings C1 to C3 that correspond to the plurality of phases, respectively. The motor drive may include a first inverter 10, a second inverter 20, a first change-over switch 30, a second change-over switch 40, a third change-over switch 50, a battery 60 (in FIG. 2), and a controller 70.

The hybrid starter generator 120 and the drive motor 140 and an arrangement position and role of each of the hybrid starter generator 120 and the drive motor 140 on a power train will be described in more detail below with reference to FIG. 2.

The first inverter 10 has a direct-current terminal and an alternating-current terminal and may include a plurality of first switching elements S11 to S16. The direct-current terminal of the first inverter 10 may be connected to the battery, and the alternating-current terminal thereof may be connected to a first terminal of each of the plurality of windings C1 to C3 of the drive motor 140.

The second inverter 20 has a direct-current terminal and an alternating-current terminal and may include a plurality of second switching elements S21 to S26. The direct-current terminal of the second inverter 20 may be connected to the direct-current terminal of the first inverter 10, and the alternating-current terminal thereof may be connected to the second change-over switch 40 and the third change-over switch 50.

The first change-over switch 30 may include a plurality of third switching elements S31 to S33. First-side terminals of the plurality of third switching elements S31 to S33 are connected to second terminals, respectively, of the plurality of windings C1 to C3 of the drive motor 140. The second-side terminals thereof are connected to each other.

The second change-over switch 40 may include a plurality of fourth switching elements S41 to S43. First-side terminals of the plurality of fourth switching elements S41 to S43 are connected to the second terminals, respectively, of the plurality of windings C1 to C3 of the drive motor 140. The second-side terminals thereof are connected to the second inverter 20. Therefore, an alternating-current terminal of the second inverter 20 and the second terminals of the plurality of wirings C1 to C3 of the drive motor 140 are selectively connected or disconnected by the plurality of fourth switching elements S41 to S43 of the second change-over switch 40.

The third change-over switch 50 may include a plurality of fifth switching elements S51 to S53. First-side terminals of the plurality of fifth switching elements S51 to S53 are connected to the second inverter 20, and second-side terminals thereof are connected to the plurality of wirings C4 to C6, respectively, of the hybrid starter generator 120 (hereinafter referred to "HSG" for convenience). Therefore, the alternating-current terminal of the second inverter 20 and the plurality of wirings C4 to C6 of the HSG 120 are selectively connected or disconnected by the plurality of fifth switching elements S51 to S53 of the third change-over switch 50.

The first inverter 10 and the second inverter 20 may convert direct-current electric power stored in the battery 60 (in FIG. 2) into three-phase alternating-current electric power and may provide the resulting electric power to each of the motors 120 and 140. Alternatively, the first inverter 10 and the second inverter 20 may convert regenerative braking energy generated due to generation of regenerative braking torque by the drive motor 140 during regenerative braking into direct-current electric power and may provide the resulting electric power to the battery 60. The conversion between the direct-current electric power and the alternating-current electric power may be performed with pulse width modulation control by the plurality of first switching elements S11 to S16 that is included in the first inverter 10 and the plurality of second switching elements S21 to S26 that is included in the second inverter 20.

The first inverter 10 may include a plurality of legs 11 to 13 to which a direct-current voltage is applied. Electric connections to the legs 11 to 13 may be made in such a manner as to correspond a plurality of phases, respectively, of the drive motor 140.

More specifically, the first leg 11 may include the two switching elements S11 and S12 that are connected in series to each other. A node that connects the two switching elements S11 and S12 to each other may be connected to a first-side terminal of the wiring C1, corresponding to one phase, of the drive motor 140, in such a manner that alternating-current electric power corresponding to one phase among a plurality of phases is input and output. Likewise, the second leg 12 may include the two switching elements S13 and S14 that are connected in series to each other. A node that connects the two switching elements S13 and S14 to each other may be connected to a first-side terminal of the wiring C2, corresponding to one phase, of the drive motor 140 in such a manner that alternating-current electric power corresponding to one phase among a plurality of phases is input and output. In addition, the third leg 13 may include the two switching elements S15 and S16 that are connected in series to each other. A node that connects the two switching elements S15 and S16 to each other may be connected to a first-side terminal of the wiring C3, corresponding to one phase, of the drive motor 140 in such a manner that alternating-current electric power corresponding to one phase among a plurality of phases is input and output.

The second inverter 20 may also have a configuration similar to that of the first inverter 10. The second inverter 20 may also include a plurality of legs 21 to 23 to which a direct-current voltage is applied. Electric connections to the legs 21 to 23 may be made in such a manner as to correspond to a plurality of phases, respectively, each of the drive motor 140 and the HSG 120.

The controller 70 is a component that performs pulse width modulation control of the switching elements S11 to S16 and S21 to S26 that are included in the first inverter 10 and the second inverter 20, respectively, in such a manner that the motors 120 and 140 are fundamentally driven based on outputs that are required of the HSG 120 and the drive motor 140, respectively. Particularly, according to various embodiments of the present disclosure, the controller 70 may determine which one of the two motors 120 and 140 needs to be driven and, when only the drive motor 140 needs to be driven, may determine an inverter that is used according to the output that is required of the drive motor 140. Accordingly, the controller 70 may determine turned-on and -off states of the switching elements S31 to S33, S41 to S43, and S51 to S53, that constitute the first change-over switch 30, the second change-over switch 40, and the third change-over switch 50, respectively, and may perform on the pulse width modulation control of the switching element of the inverter that is determined to be driven. At this point, information on whether or not each of the motors 120 and 140 is driven and a drive command (a required output, a torque command, or the like) may be transferred from a control unit at a higher level than the controller 70, for example, from the hybrid control unit (HCU) (not illustrated). The hybrid control unit is a control unit at a higher level than a controller controlling an individual drive source. The hybrid control unit may refer to a control unit that determines at least one power source that is to be driven, among the HSG 120, the drive motor 140, and an engine 110 (in FIG. 2), based on a traveling situation of the hybrid electric vehicle (a state of each element of the power train, a vehicle speed, traveling under load, a required torque, or the like) and outputs a drive command corresponding to the determined power source to a controller at a lower level. However, the hybrid control unit, as an entity that outputs the drive command, is exemplary, and the present disclosure is not limited thereto.

The controller according to an exemplary embodiment of the present disclosure may be a hardware device implemented by various electronic circuits (e.g., computer, microprocessor, CPU, ASIC, circuitry, logic circuits, etc.). The controller may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

Next, a hybrid electric vehicle in which the motor drive apparatus according to the embodiment of the present disclosure can find application is described with reference to FIG. 2.

Figure 2:
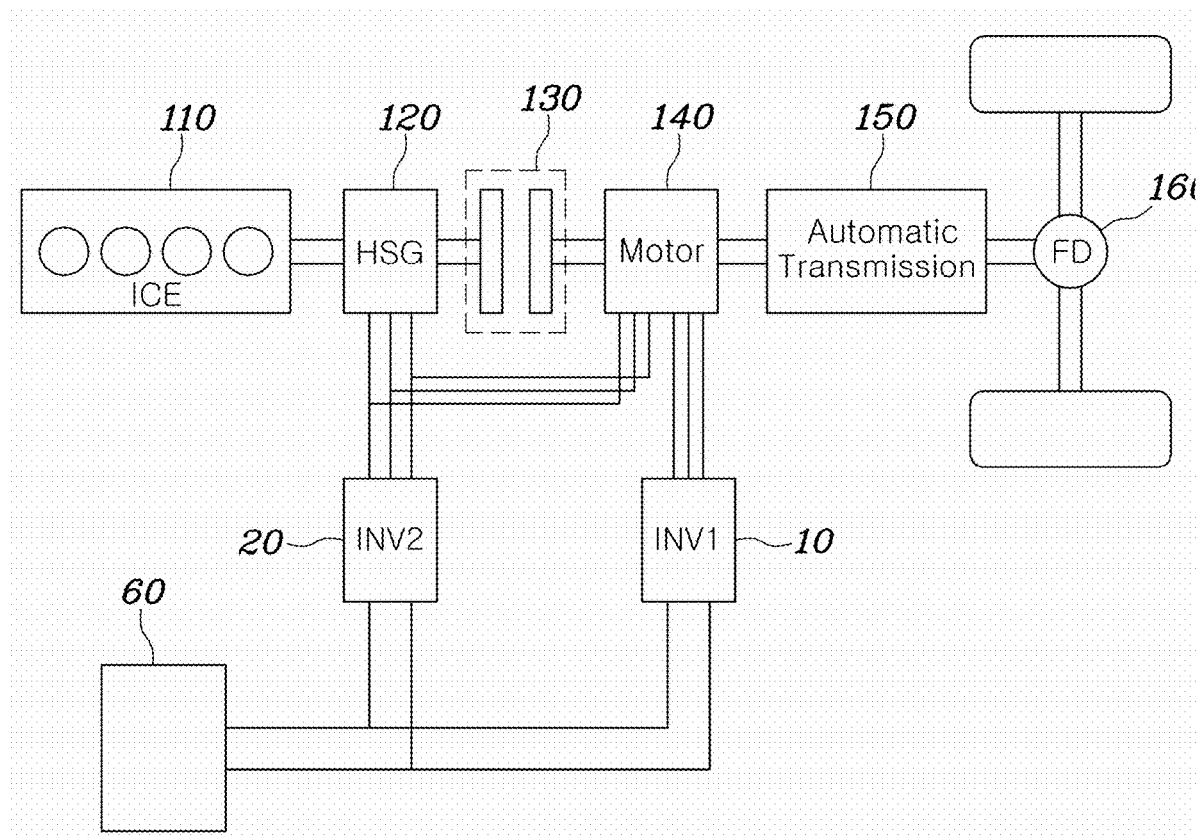
FIG. 2 is a view illustrating an example of a configuration of a power train of a hybrid electric vehicle that includes the motor drive apparatus according to the embodiment of the present disclosure.

FIG. 2 is a view illustrating an example of a configuration of a power train of a hybrid electric vehicle that includes the motor drive apparatus according to the embodiment of the present disclosure;

FIG. 2 illustrates the power train of the hybrid electric vehicle that employs a parallel-type hybrid system in which the HSG 120, an engine clutch 130, and a drive motor are sequentially arranged between an internal combustion engine (ICE) 110 and a transmission 150. The HSG 120 may be connected directly to the ICE 110 in a coaxial manner. However, as an implementation example, the HSG 120 may be connected to the ICE 110 through a pulley.

In this hybrid electric vehicle, usually, when a driver presses an accelerator (that is, when an acceleration pedal sensor is turned on), the drive motor 140 is driven by first using the electric power of the battery in a state where the engine clutch 130 is disengaged, and motive power of the motor 140 is transferred to a wheel through the transmission 150 and a final drive (FD) 160, thereby rotating a wheel (that is, switching to an EV mode) As the hybrid electric vehicle accelerates, more drive power is increasingly required. At this time, the HSG 120 may crank the ICE 110, thereby starting the ICE 110.

Accordingly, when a difference in rotational speed between the ICE 110 and the drive motor 140 falls within a predetermined range, the engine clutch 130 begins to be engaged with the ICE 110, thereby driving the hybrid electric vehicle (that is, switching from the EV mode to a HEV mode). In the HEV mode, the HSG 120 and the drive motor 140 may also output drive power according to the acquired torque and the required power. When a predetermined condition for not operating the ICE 110 is satisfied such as when the vehicle decelerates, the engine clutch 130 is disengaged and the ICE 110 stops (that is, switching from the HEV mode to the EV mode). When a rotational shaft decelerates, kinetic energy is converted into electric energy through the motors 120 and 140, and thus, charging of the battery 60 is possible. For example, the kinetic energy of the ICE 110 may be recovered through the HSG 120, and drive power of the wheel may be recovered through the drive motor 140. A process of recovering the drive power of the wheel is also referred to as regenerative braking. In some cases, when, considering the efficiency of the ICE 110, the ICE 110 operates at an operating point at which torque higher than the required torque is produced, the required torque may be produced through power generation of the drive motor 140.

Usually, as the transmission 150, a multiple-step transmission or a multiple disc clutch, for example, a dual clutch transmission (DCT) may be used.

Control of the motor drive apparatus according to the traveling situation of the hybrid electric vehicle will be described below based on the motor drive apparatus described above and a structure of the hybrid electric vehicle including the motor drive apparatus.

When the hybrid electric vehicle switches a power train mode (for example, switching from the EV mode to the HEV mode or switching from the HEV mode to the EV mode), or when the hybrid electric vehicle travels under high load, both of the HSG 120 and the drive motor 140 may be operated. Under this situation, the drive motor 140 may be driven with the first inverter 10 of the two inverters 10 and 20, and the HSG 120 may be driven with the second inverter 20. The driving of the drive motor 140 and the HSG 120 is described with reference to FIG. 3.

Figure 3:
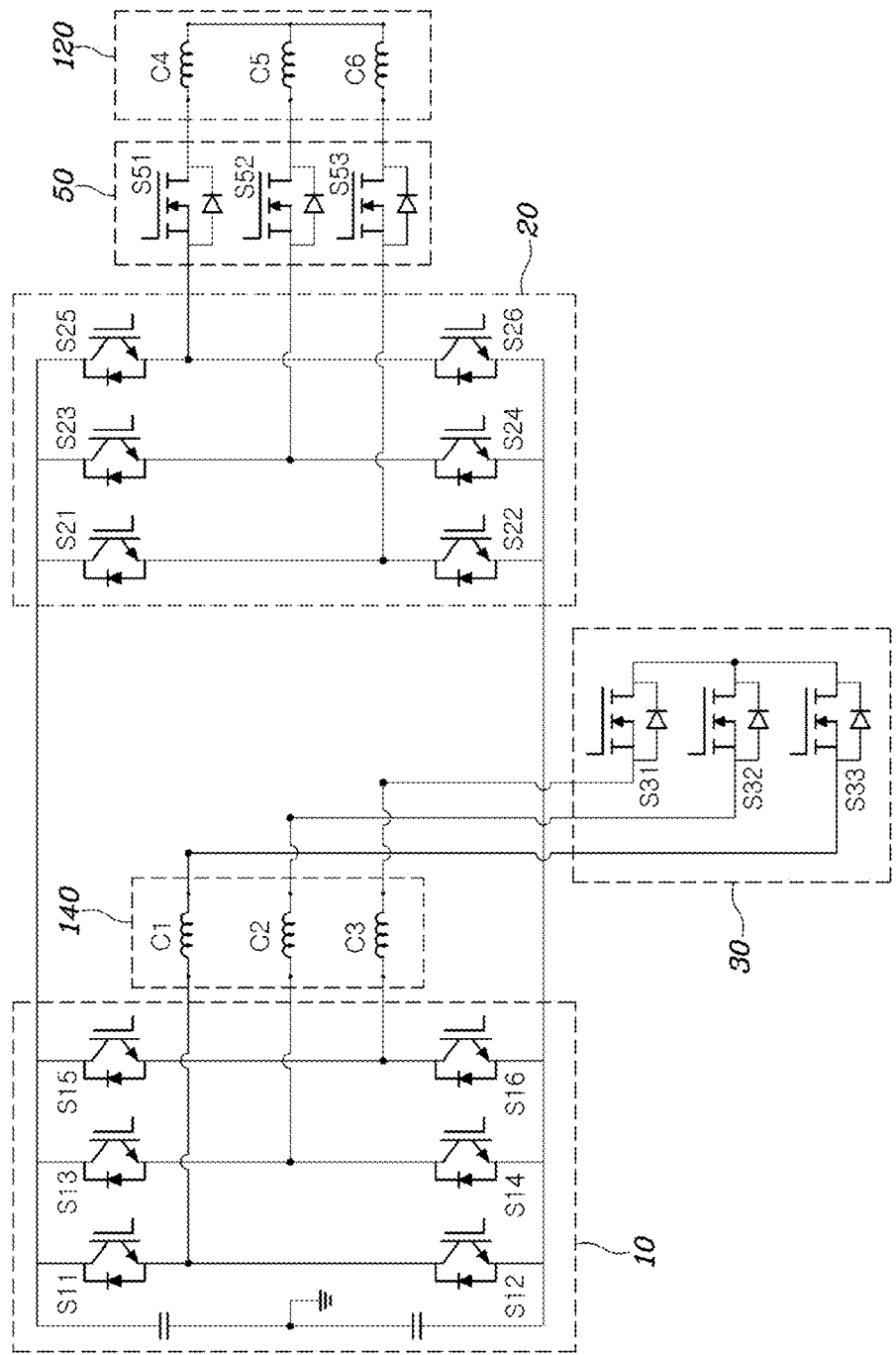
FIG. 3 is a circuit diagram illustrating a situation where a drive motor and a hybrid starter generator in the motor drive apparatus according to the embodiment of the present disclosure are driven.

FIG. 3 is a circuit diagram illustrating a situation where a drive motor and a hybrid starter generator in the motor drive apparatus according to the embodiment of the present disclosure are driven;

In order to assist in understanding the present disclosure in a simple and clear manner, an illustration of a structure configuration between nodes that do not conduct electricity because the change-over switch is turned off is omitted from FIG. 3 and subsequent figures.

With reference to FIG. 3, the first change-over switch 30 and the third change-over switch 50 are controlled by the controller 70 in such a manner as to enter a turned-on state, and the second change-over switch 40 is controlled by the controller 70 in such a manner as to enter a turned-off state.

A second terminal of each of the plurality of wirings C1 to C3 of the drive motor 140 is disconnected from the alternating-current terminal of the second inverter 20 when the second change-over switch 40 is turned off, and has a Y-connection structure when the first change-over switch 30 is turned on. Therefore, the drive motor may be driven in a closed end winding (CEW) mode.

In addition, each of the plurality of wirings C4 to C6 of the HSG 120 may be connected to the alternating-current terminal of the second inverter 20 when the third change-over switch 50 is turned on.

Consequently, in response to the torque command for each of the motors 120 and 140, the controller 70 may perform the pulse width modulation control of the plurality of first switching elements S11 to S16, thereby driving the drive motor 140, and may perform the pulse width modulation control of the second switching elements S21 to S26, thereby driving the HSG 120.

Of course, in a change-over switch control state as in FIG. 3, not only may the HSG 120 and the drive motor 140 be driven, but only one of the HSG 120 and the drive motor 140 may also be selectively driven.

In a situation where only the drive motor 140 is driven, when a high output is required of the drive motor WW140, for example, when the required output is higher than a predetermined output reference, or when an operating point in accordance with the torque command for the drive motor 140 goes beyond a mode switching reference line predetermined on a torque-RPM map, the controller 70 may drive the drive motor 140 in an open end winding (OEW) mode where there is a higher voltage utilization ratio than in the CEW mode. The driving of the drive motor 140 in the OEW mode is described with reference to FIG. 4.

Figure 4:
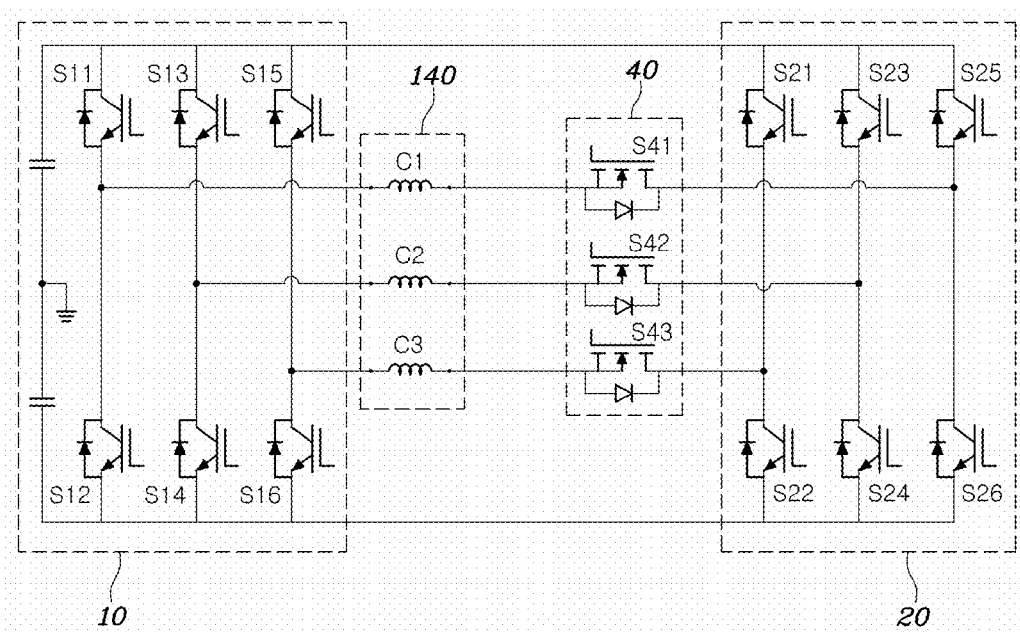
FIG. 4 is a circuit diagram illustrating a situation where the drive motor is driven in an open end winding mode in the motor drive apparatus according to the embodiment of the present disclosure.

FIG. 4 is a circuit diagram illustrating a situation where the drive motor 140 is driven in the OEW mode in the motor drive apparatus according to the embodiment of the present disclosure.

With reference to FIG. 4, the first change-over switch 30 and the third change-over switch 50 are controlled by the controller 70 in such a manner as to enter the turned-off state, and the second change-over switch 40 is controlled by the controller 70 in such a manner as to enter the turned-on state.

A second terminal of each of the plurality of windings C1 to C3 of the drive motor 140 is connected to the alternating-current terminal of the second inverter 20 when the first change-over switch 30 is turned off and when the second change-over switch 40 is turned on. That is, the first terminal of each of the plurality of windings C1 to C3 is connected to an alternating-current terminal of the first inverter 10, and the second terminal thereof is connected to the alternating-current terminal of the second inverter 20. Therefore, the drive motor 140 is in a state of being connected in the open end winding mode.

In addition, the HSG 120 is separated from the alternate current terminal of the second inverter 20 by turning off the third change-over switch 50.

Therefore, in response to the torque command for the drive motor 140, the controller 70 may control the pulse width modulation control of the plurality of first switching elements S11 to S16 and the plurality of second switching elements S21 to S26 together and thus may drive the drive motor 140 in the OEW mode.

However, the HSG 120 cannot be driven in a state of a circuit that is illustrated in FIG. 4.

Operation of the motor drive apparatus based on each of the operating situations of the hybrid electric vehicle will be described below.

FIGS. 5A to 5F are views each illustrating an example of an operating state based on each of the situations of the hybrid electric vehicle including the motor drive apparatus according to the embodiment of the present disclosure.

Figure 5A:
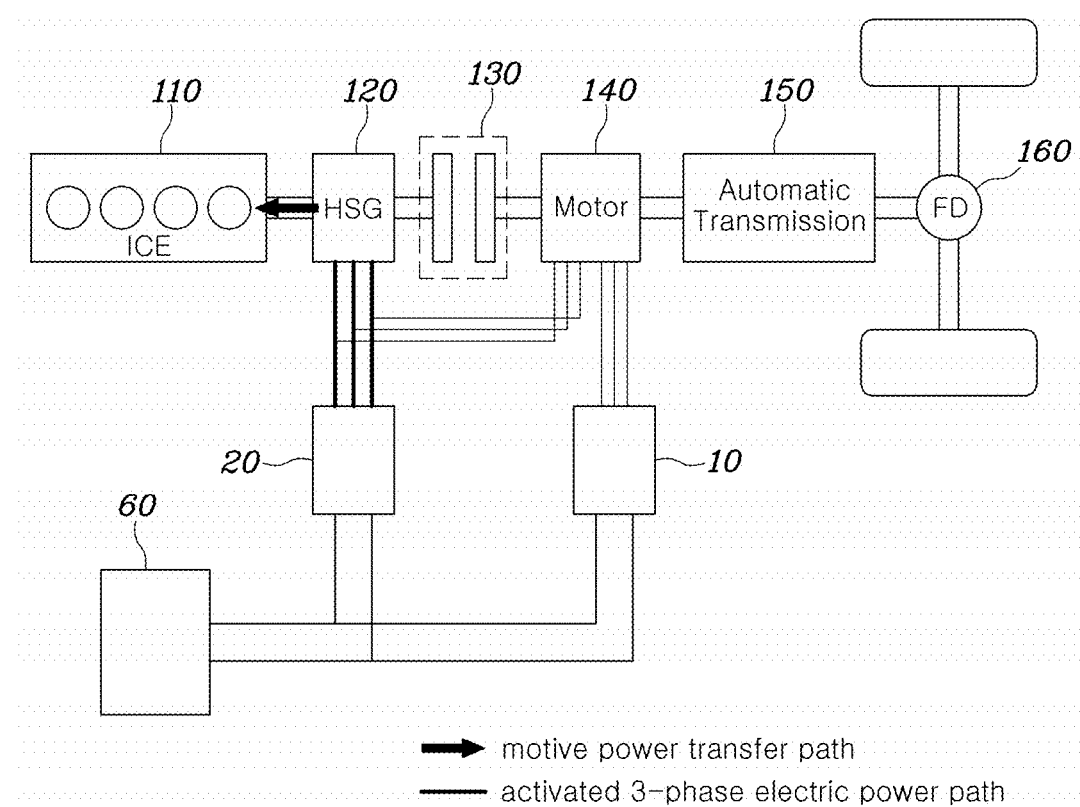
FIGS. 5A to 5F are views each illustrating an example of an operating state based on each of the situations of the hybrid electric vehicle including the motor drive apparatus according to the embodiment of the present disclosure.

First, FIG. 5A illustrates an engine cranking situation for cold starting or for starting during stop. With reference to FIG. 5A, in a state where the engine clutch 130 is disengaged, the ICE 110 is cranked with drive power of the HSG 120, and the drive motor 140 does not need to be driven in a cold-starting situation or in a starting situation during stop. Therefore, in the state of the circuit as in FIG. 3, only the HSG 120 may be driven by the second inverter 20.

Figure 5B:
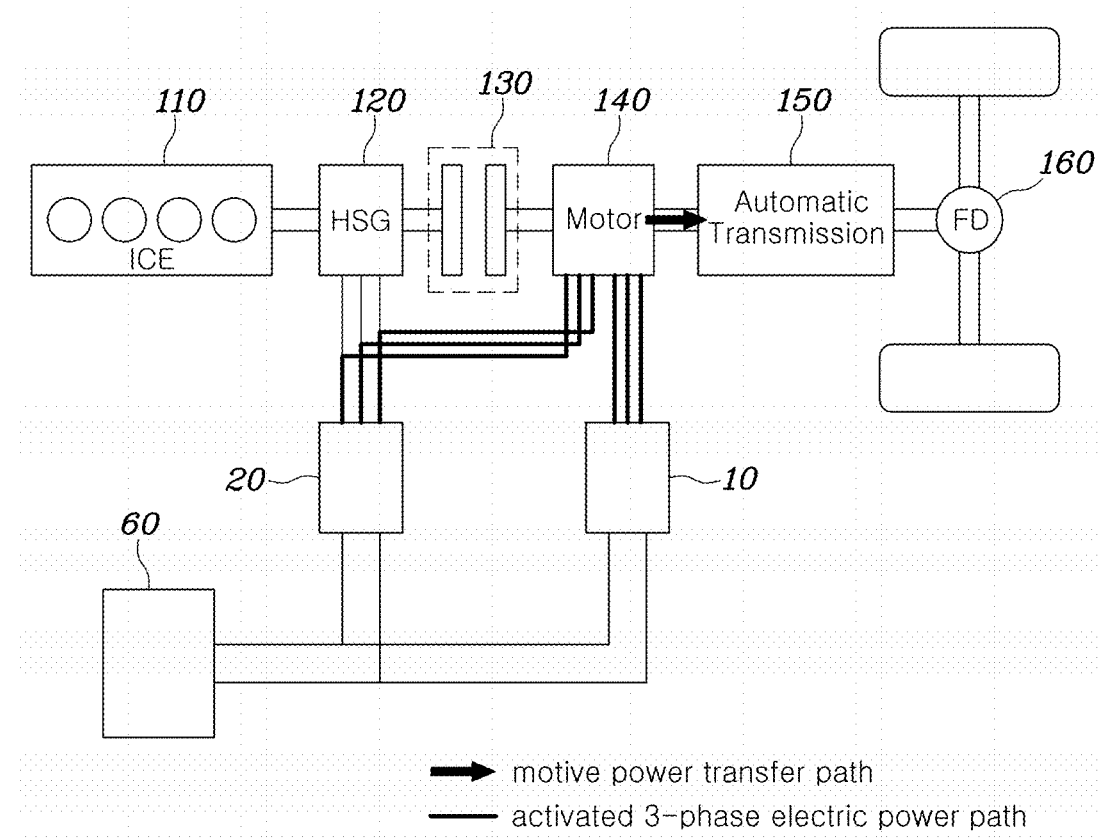

FIG. 5B illustrates a situation where the hybrid electric vehicle travels at a high speed in the EV mode. With reference to FIG. 5B, because the EV mode is entered, the engine clutch 130 is in a disengaged state, and the ICE 110 is also not driven. However, the operating point is in a high-speed region, and thus the controller 70 may control the motor 140 together with the first inverter 10 and the second inverter 20 in such a manner as to enter the state of the circuit as in FIG. 4 and thus may the drive motor 140 in the OEW mode.

Figure 5C:
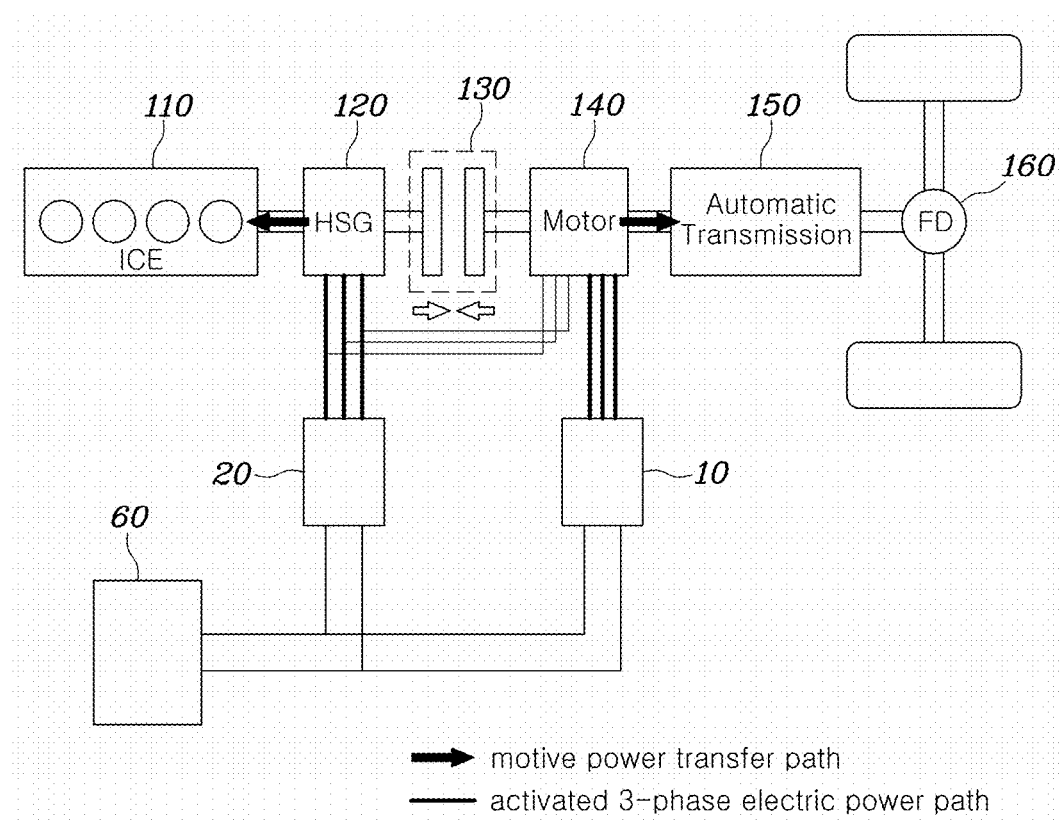

FIG. 5C illustrates a situation where switching from the EV mode to the HEV mode takes place. With reference to FIG. 5C, the drive motor 140 has to be driven until before switching to the HEV mode is completed, and the HSG 120 has to be driven in order to crank the ICE 110. Therefore, in the state of the circuit as in FIG. 3, the controller 70 may drive the drive motor 140 and the HSG 120 through the first inverter 10 and the second inverter 20, respectively. When the engine clutch 130 is engaged, switching to the HEV mode may be completed. The HSG 120 and the drive motor 140 may be turned off according to the traveling situation of the hybrid electric vehicle.

Figure 5D:
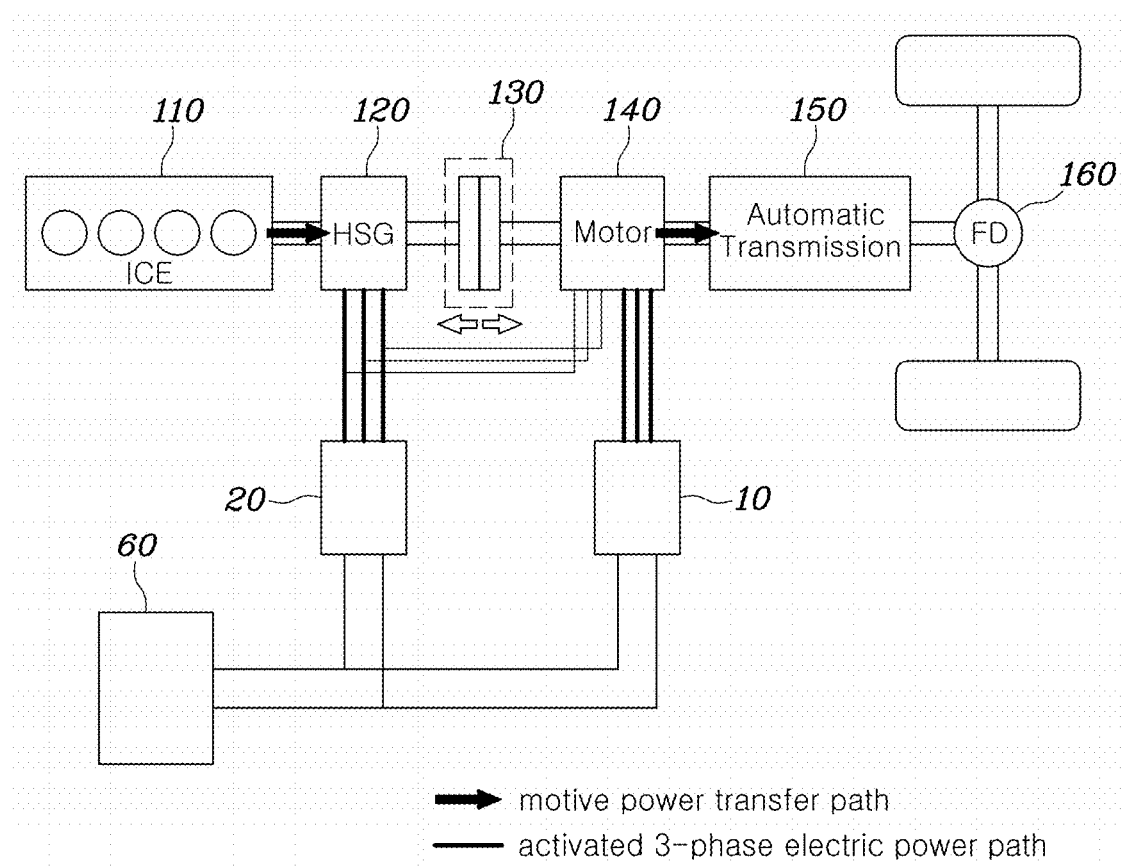

FIG. 5D illustrates a situation where switching from the HEV mode to the EV mode takes place. With reference to FIG. 5D, because the switching to the EV mode takes place, the engine clutch 130 is disengaged. Therefore, the drive motor 140 needs to provide drive power to the wheel. When the ICE 110 does not operate, remaining kinetic energy of the ICE 110 may be recovered by power generation by the HSG 120. Therefore, the HSG 120 and the drive motor 140 have to be driven. To this end, in the state of the circuit as in FIG. 3, the controller 70 may drive the drive motor 140 and the HSG 120 through the first inverter 10 and the second inverter 20, respectively.

Figure 5E:
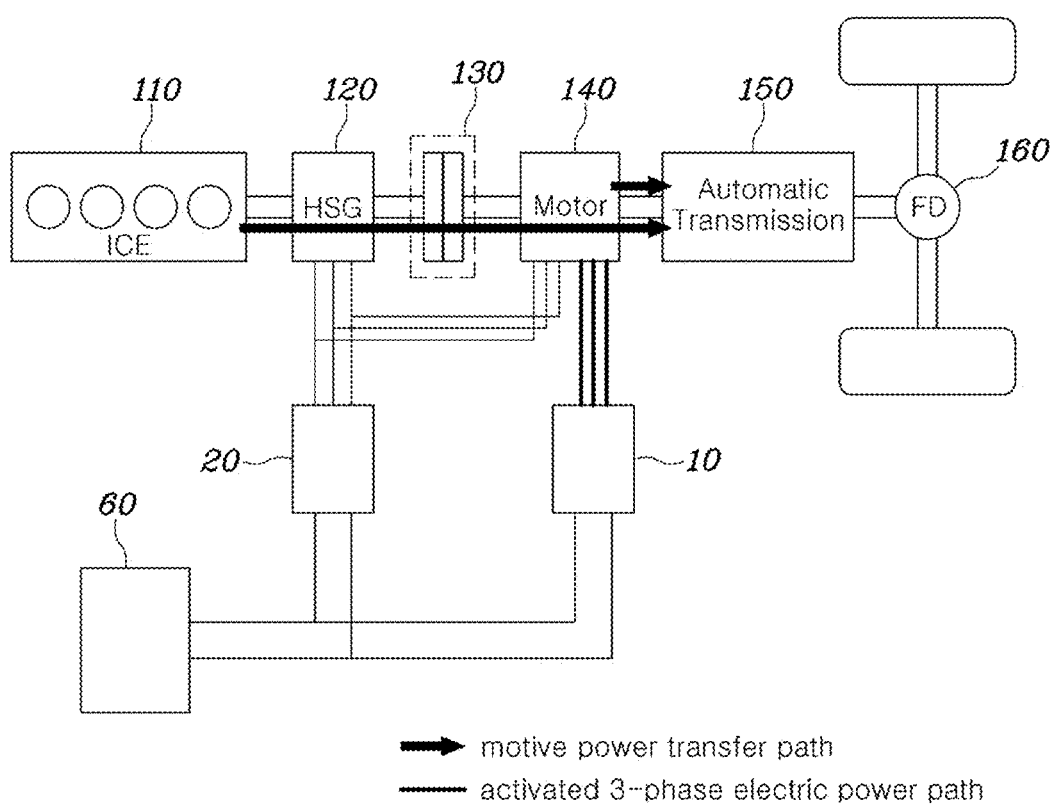

FIG. 5E illustrates a situation where load that is applied while hybrid electric vehicle travels is at a middle or low level in the HEV mode. With reference to FIG. 5E, the ICE 110 may be driven at an operation point where optimal efficiency is obtained. Because the load that is applied while the hybrid electric vehicle travels is not comparatively high, a difference between an engine output at the optimal-efficiency operating point and the load that is applied while the hybrid electric vehicle travels may be satisfied by only the drive motor 140 generating positive torque or negative torque (that is, power generation). Therefore, in the state of the circuit as in FIG. 3, the controller 70 may control the drive motor 140 in the CEW mode through the first inverter 10.

Figure 5F:
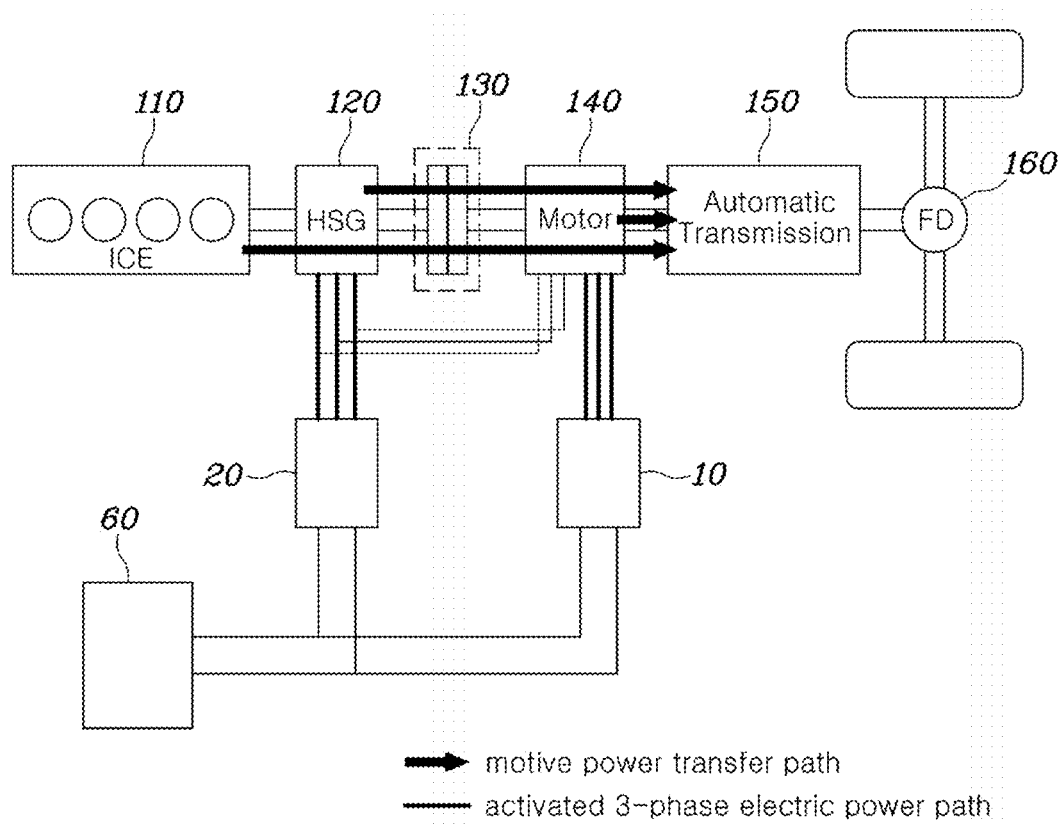

Next, FIG. 5F illustrates a situation where the load that is applied while the hybrid electric vehicle travels is at a high level in the HEV mode. With reference to FIG. 5F, the required torque is higher than maximum torque of the ICE 110. Thus, each of the HSG 120 and the drive motor 140 may output torque together with the ICE 110. To this end, in the state of the circuit as in FIG. 3, the controller 70 may drive the drive motor 140 and the HSG 120 through the first inverter 10 and the second inverter 20, respectively.

According to the embodiment described so far of the present disclosure, with only two inverters instead of an additional three-phase full-bridge inverter, the drive motor 140 and the HSG 120 may be driven, or only the drive motor 140 may be selectively driven in the CEW mode or the OEW mode.

Therefore, the number of semiconductor elements for electric power can be decreased more than when an additional inverter is used to drive the HSG 120. A function for electric-current and temperature sensing that is required of a HSG inverter system can be integrated into the second inverter. Therefore, a configuration of a gate board can be simplified, thereby reducing a packaging size of a power module.

The specific embodiment of the present disclosure is described above with reference to the drawings. It would be obvious to a person of ordinary skill in the art that various modification and alterations are possibly made to the specific embodiment of the present disclosure within the claimed scope of the present disclosure.

What is claimed is:

1. A motor drive apparatus driving a first motor having a plurality of first wirings and a second motor having a plurality of second wirings, the motor drive apparatus comprises:
    a first inverter including a plurality of first switching elements, an alternating-current terminal of the first inverter being connected to a first terminal of each of the plurality of first wirings;
    a second inverter including a plurality of second switching elements;
    a first change-over switch including a plurality of third switching elements, first-side terminals of the plurality of third switching elements being connected to second terminals of the plurality of first wirings, respectively, and second-side terminals thereof being connected to each other;
    a second change-over switch including a plurality of fourth switching elements, first-side terminals of the plurality of fourth switching elements being connected to the second terminals of the plurality of first wirings, respectively, and second-side terminals thereof being connected to an alternating-current terminal of the second inverter;
    a third change-over switch including a plurality of fifth switching elements, first-side terminals of the plurality of fifth switching elements being connected to the alternating-current terminal of the second inverter, and second-side terminals thereof being connected to first terminals of the plurality of second wirings, respectively; and
    a controller configured to control turned-on and-off states of the first switching element to fifth switching element in response to a drive command for one of the first motor, the second motor and a combination thereof,
    wherein second terminals of the plurality of second wirings are connected to each other.

2. The motor drive apparatus of claim 1, wherein when the first motor and the second motor are driven, the controller turns on the first change-over switch and the third change-over switch and turns off the second change-over switch.

3. The motor drive apparatus of claim 2, wherein the controller performs pulse width modulation control of the plurality of first switching elements, thereby driving the first motor and performs the pulse width modulation control of the plurality of second switching elements, thereby driving the second motor.

4. The motor drive apparatus of claim 1, wherein the controller turns off the first change-over switch and the third change-over switch and turns on the second change-over switch, thereby driving the first motor in an open end winding mode.

5. The motor drive apparatus of claim 4, wherein the controller performs pulse width modulation control of the first switching element and the second switching element in the open end winding mode, thereby driving the first motor.

6. The motor drive apparatus of claim 1, wherein when the drive command indicates that only the first motor is driven, the controller drives the first motor in a closed end winding mode or an open end winding mode based on an operating point in accordance with a required output.

7. The motor drive apparatus of claim 6, wherein the controller turns on the first change-over switch and the third change-over switch and turns off the second change-over switch in the closed end winding mode and turns off the first change-over switch and the third change-over switch and turns on the second change-over switch in the open end winding mode.

8. A hybrid electric vehicle comprising:
    a first motor having a plurality of first windings;
    a second motor having a plurality of second windings;
    an engine;
    a control unit outputting a drive command for driving one of the first motor, the second motor and combination thereof, and the engine based on a traveling situation; and
    a motor drive apparatus driving one of the first motor, the second motor and combination thereof in response to the drive command,
    wherein the motor drive apparatus comprises:
    a first inverter including a plurality of first switching elements, an alternating-current terminal of the first inverter being connected to a first terminal of each of the plurality of first wirings;

a second inverter including a plurality of second switching elements;

a first change-over switch including a plurality of third switching elements, first-side terminals of the plurality of third switching elements being connected to second terminals of the plurality of first wirings, respectively, and second-side terminals thereof being connected to each other;

a second change-over switch including a plurality of fourth switching elements, first-side terminals of the plurality of fourth switching elements being connected to the second terminals of the plurality of first wirings, respectively, and second-side terminals thereof being connected to an alternating-current terminal of the second inverter;

a third change-over switch including a plurality of fifth switching elements, first-side terminals of the plurality of fifth switching elements being connected to the alternating-current terminal of the second inverter, and second-side terminals thereof being connected to first terminals of the plurality of second wirings, respectively; and a controller configured to control turned-on and-off states of the first switching element to fifth switching element in response to a drive command for one of the first motor, the second motor and combination thereof, wherein second terminals of the plurality of second wirings are connected to each other.

9. The hybrid electric vehicle of claim 8, further comprising:

an engine clutch arranged between the engine and the first motor, wherein the second motor is connected to the engine.

10. The hybrid electric vehicle of claim 9, wherein the second motor is connected directly to the engine in a coaxial manner, and the engine clutch is arranged between the second motor and the first motor.

11. The hybrid electric vehicle of claim 8, wherein when the first motor and the second motor are driven, the controller turns on the first change-over switch and the third change-over switch and turns off the second change-over switch.

12. The hybrid electric vehicle of claim 11, wherein the controller performs pulse width modulation control of the plurality of first switching elements, thereby driving the first motor and performs the pulse width modulation control of the plurality of second switching elements, thereby driving the second motor.

13. The hybrid electric vehicle of claim 8, wherein the controller turns off the first change-over switch and the third change-over switch and turns on the second change-over switch, thereby driving the first motor in an open end winding mode.

14. The hybrid electric vehicle of claim 13, wherein the controller performs pulse width modulation control of the first switching element and the second switching element in the open end winding mode, thereby driving the first motor.

* * * * *